Dec. 9, 1947.   J. W. PETRIE   2,432,337
EQUIPMENT FOR MAGICAL EFFECTS
Filed June 18, 1946   2 Sheets-Sheet 2
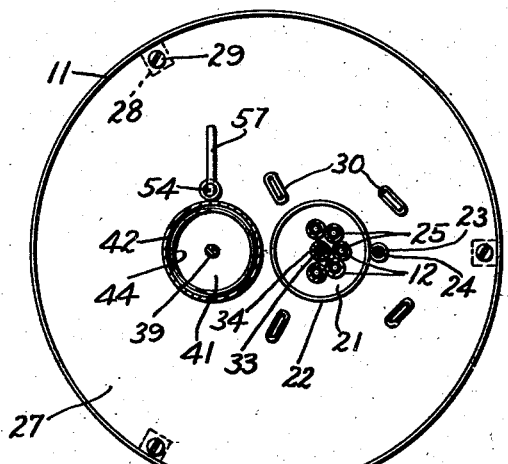
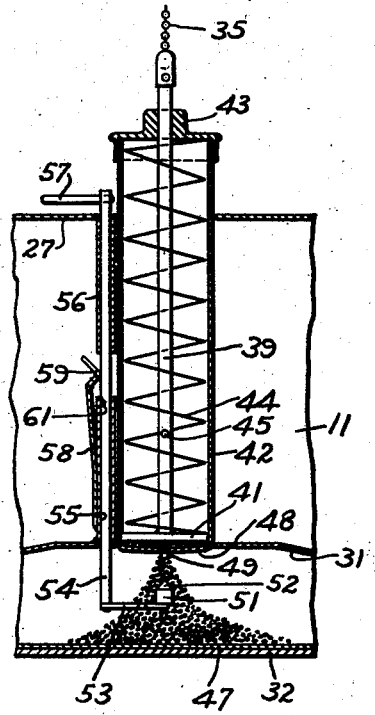
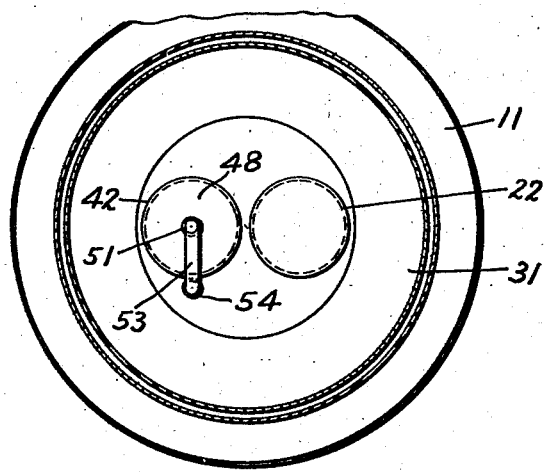
INVENTOR
John W. Petrie.
BY
ATTORNEY Patented Dec. 9, 1947

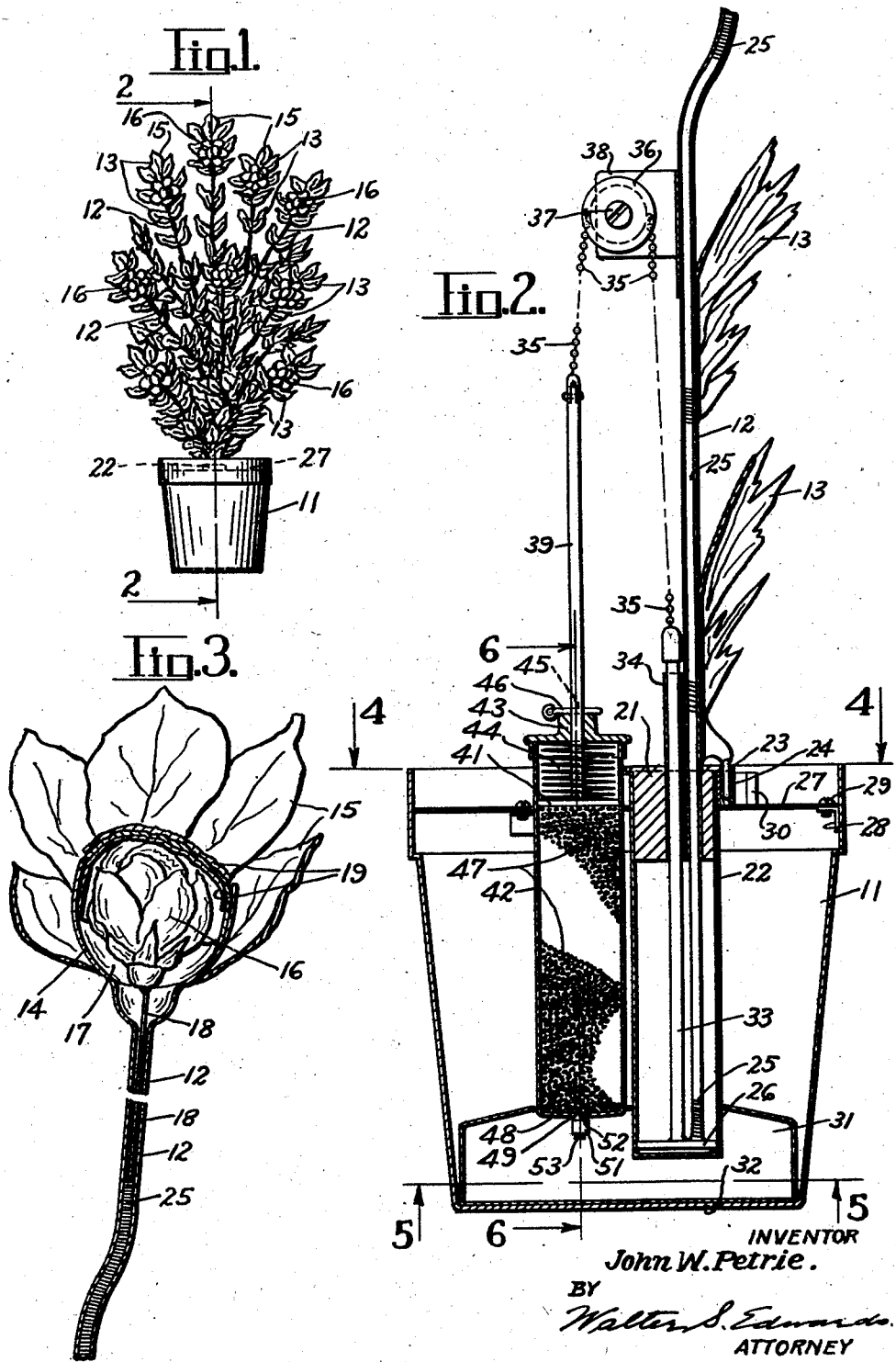

2,432,337

UNITED STATES PATENT OFFICE 2,432,337

EQUIPMENT FOR MAGICAL EFFECTS

John W. Petrie, New Haven, Conn.

Application June 18, 1946, Serial No. 677,570

14 Claims. (Cl. 272—8)

1

This invention relates to equipment for magical effects and more particularly to equipment, and the mechanism for operating the same, for creating the impression of a rapidly flowering bush, or the like.

In such mechanism, a flower, or the like, is hidden amongst the foliage of the bush, or plant, and is gradually pushed upwardly to become visible to an audience without any apparent assistance from the magician. The effect is mystifying, in that at first the flower color becomes visible resembling the budding of the plant, and then a full bloom flower, or flowers, emerge that can be readily removed and passed out to the audience. The mechanism is so constructed that real flowers, such as roses, previously cut from a bush in a garden, may be used, thus increasing the illusive effect.

One object of this invention is to provide improved mechanism for actuating the device whereby the operation thereof will be positive and reliable.

Another object is to provide in such devices, means to control the speed of the operation and means to insure smooth and noiseless action.

A further object of this invention is to provide an improved equipment for magical effects which will be relatively inexpensive to manufacture, simple in construction, practical, pleasing in appearance, and very efficient and durable in use.

With these and other objects in view, which will appear as the description proceeds, there has been illustrated in the accompanying drawings, one form in which the features and principles of this invention may be embodied in practice.

In the drawings:

Figure 1 is a front view of a plant, simulating a rose bush, embodying the features and principles of this invention, whereby the magical effect of the flowers of the plant becoming in full bloom may be created;

Figure 2 is a vertical sectional view taken on the line 2—2 of Figure 1, only one flower stem holder being shown for the sake of clearness;

Figure 3 is a continuation of Figure 2 at the upper portion thereof to show the flower and associated structure at the upper end of the flower stem holder of Figure 2;

Figure 4 is a cross section taken on the line 4—4 of Figure 2 and is a top plan view of the flower pot, or plant support, and of the mechanism for actuating the device;

Figure 5 is a cross-sectional view taken on the line 5—5 of Figure 2 and looking in the direction of the arrows; and Figure 6 is a vertical sectional view taken on the line 6—6 of Figure 2.

Referring now to the drawings wherein like reference numerals designate like parts throughout the several views, the reference numeral 11 denotes a plant holder generally in the form of a flower pot and by which the plant and the mechanism for operating the same are supported. The plant, in this instance, is made to simulate a rose bush and is provided with a plurality of tubes 12, simulating stalks, or stems, which rise upwardly from the holder 11 and spread apart in a more or less natural manner, see Figure 1. Leaves 13, formed of stiff material are fastened to the stalks 12 to create the effect of a fully foliaged bush, and to hide the mechanism parts disposed at the rear of the stalks. Each stalk, or tube, 12 terminates in a cup-shaped member 14 and opens into its bottom. The member 14 is surrounded by leaves 15 and is adapted to receive a flower, such as a rose, 16, in its cavity 17, with the flower stem 18 threaded downwardly into the tube 12, see Figure 3. Soft flexible material such as crepe paper, or cloth, and being in the form of flaps 19, have one end secured to the inner surface of the cavity 17 and are adapted to have their loose ends evenly folded over on top of the flower 16, disposed in the said cavity.

The holder stalks, or tubes 12, extend downwardly from the cup-shaped flower containers 14 and are fastened in a stopper 21 snugly fitting in the upper end of a hollow cylinder 22. To position the bush, or plant, in respect to the holder 11, a short downwardly directed stud 23 is secured, as by soldering, to the tubes 12 and is adapted to be received in a short tube 24 secured to the upper end of the cylinder 22. An elongated flexible core 25 extends through each of the hollow stalks, or tubes, 12. The cores 25 may be made from lengths of closely wound spring, or be of flexible metal wire, adapted to readily slide lengthwise through the tubes 12 even though the latter are bent to spread them apart. The lower ends of the cores 25 are suitably secured to a disc 26 disposed in, and readily slidable lengthwise of, the cylinder 22. The upper end of the cores 25 are adapted to engage the lower ends of the flower stems 18 to move the flower upwardly when the disc 26 is raised in the cylinder 22. The cylinder 22 passes through a cover plate 27, in this instance, in the form of a disc which is adapted to enter the upper open end of the holder 11 to form a cover therefor. The plate 27 rests upon brackets 28, secured to and extending inwardly from the sides of the holder 14, and is secured thereto by screws 29. The cylinder 22 extends downwardly from the plate 27 and passes into and is secured to a closed container 31 which is adapted to seat upon the bottom 32 of the holder 11. Short laterally elongated tubes 30 may be provided extending upwardly from the cover plate 27 to hold extra leaf stalks, if desired.

A rod 33, secured at its lower end to the disc 26, extends upwardly therefrom and through a guide tube 34, passing through and secured in the stopper 21. The rod 33 at its upper end is secured to one end of a flexible belt, or chain, 35, which extends upwardly therefrom and loops over a pulley 36. The pulley 36 is journaled on a shaft 37 held by a bracket 38 which is fastened, as by soldering, to the bank of tubes, or stalks 12. The chain 35 then extends downwardly and has its other end secured to the upper end of a rod 39, the lower end of which is secured to a disc 41 disposed in, and readily slidable lengthwise of, a cylinder 42. The rod 39 passes through and is guided by a cap 43 screw-threaded on the upper end of the cylinder 42.

A coiled spring 44 is disposed in the cylinder 42 and reacts between the disc 41 and the cap 43 to constantly urge the disc 41 downwardly in the cylinder 42 to pull upon the chain 35 through it to raise the disc 26 in the cylinder 22. The cylinder 42 passes through and is secured to the cover plate 27, and extends from this plate downwardly and is secured to the closed container 31. A hole 45 is provided in the rod 39 and is spaced upwardly from the disc 41 a sufficient amount so that the disc 41 and rod 39 will be held in their extreme position, with the disc 26 down in the cylinder 22, when a pin 46 is passed through the hole 44 to rest on top of the cap 43, the spring 44 being compressed when the parts are in such position, as shown in Figure 2.

Removal of the pin 46 from the hole 45 will release the spring 44 to act on the disc 41 and move it downwardly in the cylinder 42 and actuate the mechanism. This action would be too rapid, and to slow down such action, the cylinder 42 is filled with granular material, preferably made of particles 47 spheroidal in shape and of a hard material impervious to moisture, such as glass, plastic, or the like. Particles 47 from .008 to .032 inch in diameter have been found to give very good results. Moisture absorbing material, or material upon which excess moisture will collect has been found to be detrimental to use, as the particles bind together, or tend to adhere into lumps, blocking the desired smooth and reliable action of the mechanism.

The lower end of the cylinder 42 is closed by an end plate 48, in the center of which, a hole 49 is formed. The particles 47, under the urge of the spring 44 acting through the disc 41 form a fluid brake on the action of the downward movement of the disc 41, in the cylinder 42, as they pass downwardly and out of the hole 49 and into the closed container 31. A valve stud 51, having a cone-shaped upper end 52, is disposed directly in line with the hole 49 in the end plate 48 of the cylinder 42, being supported in such position upon a bar 53 extending laterally from the lower end of an actuating rod 54. The stud 51 and the hole 49 form a valve to control the movement of the particles 47 from the cylinder 42. By raising the stud 51 to close the hole 49 no particles can escape from the cylinder 42 and the action of the mechanism will stop, and by lowering the stud to fully open the hole 49, the extreme in the rate of speed of actuation will be obtained. The cone-shaped top 52 of the valve stud 51 acts on the particles 47, dropping through the hole 49, to deflect and spread them around in the container 31, see Figure 6.

The valve actuating rod 54 extends upwardly from the bar 53 through a tube 55 secured to and extending upwardly from the top of the container 31. The rod 54 is then left uncovered a short distance and then enters and passes through a tube 56 secured to and depending from the cover plate 27. The rod 54 extends above the cover plate 27 and has a handle bar 57 extending laterally therefrom. A leaf spring 58, having a V-shaped catch portion 59, adjacent its upper end, is secured at its lower end to the tube 55 and is spring-pressed against the exposed portion of the rod 54 between the opposing ends of the tubes 55 and 56. A catch notch 61 is formed in the rod 54 in position to be engaged by the V-shaped catch portion 59, of the spring 58, to hold the rod 54 and with it the valve stud 51 in hole 49 closing position, as shown in Figure 2.

*Operation*

Assuming that the device has been operated and the flowers have been fully exposed to view, due to being raised out of the cavities 17 by the action of the cores 25 upon the various flower stems 18 by the raising movement of the disc 26, the parts of the mechanism will be in the following positions. The disc 41 will be in lowered position in the tube 42, the spring 44 fully extended and substantially all of the particles 47 will be in the container 31, see Figure 6, and the disc 26 will be in raised position in the tube 22.

To set the device for another operation thereof, the rod 39 is pulled upwardly against the tension of the spring 44 and the rod 33 is pushed downwardly carrying with it the cores 25. The pin 46 is now inserted through the hole 45 to hold the parts in such positions. The valve stud 51 is in open position uncovering the hole 49. The device is now turned upside down to allow the particles 47 to flow back into the cylinder 42 through the hole 49 from the container 31. After substantially all of the particles 47 are in the cylinder 42, the valve stud 51 is raised to close the hole 49 by raising the rod 54 by its handle 57 until the catch 59 drops into the notch 61. The device is now righted and set upon a table, or other support. Freshly cut roses 16, or the like, are placed in the cavities 17 with their stems 18 threaded into the tubes 12. The flaps 19 are then folded over on top of the roses 16 and the device is ready for operation.

To start operation of the device the pin 46 is withdrawn from the hole 45 allowing the spring 44 to act on the disc 41 to press it downwardly in the cylinder 42 against the particles 47. The valve stud 51 is lowered by pressure applied upon the rod 54 to disengage it from the catch 59 whereby the hole 49 is opened to allow the particles 47 to flow out of the cylinder 42 into the container 31. As the disc 41 lowers, due to the movement of the particles from the cylinder 42, the disc 26 is raised through its connection with the disc 41 by means of the chain 35 with the rods 25 and 39. As the disc 26 raises, the cores 25 engage the flower stems 18 to gradually push the roses 16 upwardly. Upward movement of the roses 16 in the cavities 17 gradually unfolds the flaps 19 and the roses 16 begin to be observed, first as buds, due to only being partly uncovered, and later as being in full bloom, thus creating a magical effect. The speed of the action above described may be controlled by the valve stud 51, through the rod 54, its position in respect to the hole 49 determining the rate of flow of the particles 47 through the hole 49 and thus the lowering movement of the disc 41 under action of the spring 44.

It will be understood that the novel features and principles of this invention may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully disclosed the invention, what is claimed as new and for which it is desired to secure Letters Patent is:

1. In a device for creating magical effects, a hollow stalk, a cup-shaped member secured to the upper end of said stalk and adapted to hold a flower-like article therein with its stem threaded into said stalk, a flexible core slidable in said stalk, means to move the flexible core upwardly to raise the article from the member, and means to control the action of said core moving means.

2. In a device for creating magical effects, a hollow stalk, a cup-shaped member secured to the upper end of said stalk and adapted to hold a flower-like article therein with its stem threaded into said stalk, a flexible core slidable in said stalk, means engaging the bottom end of said core to move it in said stalk, and rate of movement controlled by means to raise said core engaging means.

3. In a device for creating magical effects, a hollow stalk, a cup-shaped member secured to the upper end of said stalk and adapted to hold a flower-like article therein with its stem threaded into said stalk, a flexible core slidable in said stalk, means engaging the bottom end of said core to move it in said stalk, a movable member connected to said core engaging means to move it, means to move said movable member in a direction to move said core engaging means to raise it and through it raise said core, and means to effect a braking action on the movement of said movable member to control the raising movement of said core.

4. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, and means to control the action of said spring on said second member.

5. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, and a fluid brake device acting against the said second member to control the movement thereof by said spring.

6. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member, said cylinder having a hole formed therein adjacent its other end, and releasable fluid braking means disposed between the other end of said cylinder and said second member to resist the action of said spring as said fluid flows through the hole in the cylinder.

7. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member, said cylinder having a hole formed therein adjacent its other end, a plurality of particles in said cylinder between said second member and the other end of said cylinder to resist the action of said spring, and means to control the escape of said particles from said cylinder through the hole therein.

8. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member, said cylinder having a hole formed therein adjacent its other end, a plurality of particles of non-moisture absorbing material in said cylinder between said second member and the other end of the cylinder to resist the action of said spring to move the second member, and means to control the escape of said particles from the cylinder through the hole therein.

9. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member, said cylinder having a hole formed therein adjacent its other end, a plurality of substantially spheroidal particles .008 to .032 inch in diameter, and of non-moisture absorbing material, in said cylinder between said second member and the other end of said cylinder to resist the action of the spring on said second member, and means to control the escape of said particles from the cylinder through the hole therein.

10. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member, said cylinder having a hole formed therein adjacent its other end, a plurality of particles in said cylinder between said second member and the other end of said cylinder to resist the action of said spring, a valve stud in alignment with the hole in said cylinder, and means to actuate said valve stud to control the flow of particles through the said hole.

11. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between the end of said cylinder and said second member, said cylinder having a hole formed therein adjacent its other end, a plurality of particles in said cylinder between said second member and the other end of said cylinder to resist the action of said spring, a valve stud in alignment with the hole in said cylinder, and means to actuate said valve stud to control the flow of particles through the said hole, the hole closing end of said valve stud being conical to spread the particles as they emerge from the said hole.

12. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member to move the latter in said cylinder, a closed receptacle below said cylinder, said cylinder having a hole in the other end thereof in communication with the interior of the receptacle, a plurality of particles in said cylinder below the second member, and means to control the flow of said particles through the said hole in said cylinder.

13. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member to move the latter in said cylinder, a closed receptacle below said cylinder, said cylinder having a hole in the other end thereof in communication with the interior of the receptacle, a plurality of particles in said cylinder below the second member, a valve stud in alignment with the hole in said cylinder, and means to actuate said valve stud to control the flow of particles through the said hole.

14. In a device for creating magical effects, a hollow stalk, a core slidable in said stalk, an article engaged by an end of said core to be moved thereby upon movement of said core in the stalk, a first part secured to the other end of said core, a second member connected to said first member to move it when the second member is moved, a spring to move the second member, a cylinder in which said second member and said spring are disposed, said spring reacting between one end of said cylinder and said second member to move the latter in said cylinder, a closed receptacle below said cylinder, said cylinder having a hole in the other end thereof in communication with the interior of the receptacle, a plurality of particles in said cylinder below the second member, a valve stud in alignment with the hole in said cylinder, and means to actuate said valve stud to control the flow of particles through the said hole, the hole closing end of said valve stud being conical to spread the particles as they emerge from the said hole.

JOHN W. PETRIE.